(12) United States Patent
Kanazawa

(10) Patent No.: US 11,440,426 B2
(45) Date of Patent: Sep. 13, 2022

(54) ELECTRIC VEHICLE AND ELECTRIC VEHICLE CONTROL METHOD AUTOMATICALLY SELECTING POWER SUPPLIED TO OUTSIDE FROM ENGINE OR BATTERY OF ELECTRIC VEHICLE

(71) Applicant: HONDA MOTOR CO., LTD., Tokyo (JP)

(72) Inventor: Hiroyuki Kanazawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 17/054,780

(22) PCT Filed: Apr. 4, 2019

(86) PCT No.: PCT/JP2019/014993
§ 371 (c)(1),
(2) Date: Nov. 12, 2020

(87) PCT Pub. No.: WO2019/225168
PCT Pub. Date: Nov. 28, 2019

(65) Prior Publication Data
US 2021/0104901 A1    Apr. 8, 2021

(30) Foreign Application Priority Data

May 22, 2018  (JP) .............................. JP2018-098039

(51) Int. Cl.
*B60L 53/00*     (2019.01)
*B60L 53/57*     (2019.01)
(Continued)

(52) U.S. Cl.
CPC ............... *B60L 53/57* (2019.02); *B60L 1/006* (2013.01); *B60L 50/50* (2019.02); *B60L 53/53* (2019.02);
(Continued)

(58) Field of Classification Search
CPC .......... B60L 53/57; B60L 53/66; B60L 50/50; B60L 50/00; B60L 1/006; B60L 53/53;
(Continued)

(56) References Cited

U.S. PATENT DOCUMENTS 9,184,587 B2 * 11/2015 Mizuno ..................... H02J 1/00
9,505,311 B2 * 11/2016 Frank ..................... B60L 1/006
(Continued)

FOREIGN PATENT DOCUMENTS

CN      107591873 A  *  1/2018
CN      107901904 A  *  4/2018
(Continued)

OTHER PUBLICATIONS

International Search Report and Written Opinion for International Application No. PCT/JP2019/014993 dated Jun. 25, 2019, 9 pages.

*Primary Examiner* — Naum Levin
(74) *Attorney, Agent, or Firm* — Amin, Turocy & Watson, LLP

(57) ABSTRACT

An electric vehicle is able to supply electric power to a vehicle outside and includes: an electric power generation part; an electric power storage part; and a control part that performs control such that electric power supplied from the electric power generation part or electric power supplied from the electric power storage part is automatically selected on a vehicle side in response to information obtained from an electric power supply target apparatus at the vehicle outside, and an electric power supply to the electric power supply target apparatus is performed.

9 Claims, 10 Drawing Sheets

(51) Int. Cl.
*B60L 50/50* (2019.01)
*B60L 55/00* (2019.01)
*B60L 53/53* (2019.01)
*B60L 53/66* (2019.01)
*B60L 1/00* (2006.01)
*H02J 7/00* (2006.01)

(52) U.S. Cl.
CPC ............... *B60L 53/66* (2019.02); *B60L 55/00* (2019.02); *H02J 7/0068* (2013.01)

(58) Field of Classification Search
CPC ....... B60L 50/60; H02J 7/0068; H02J 7/0034; H02J 7/0047; H02J 7/1438; H02J 7/1492; H02J 7/00342; B60W 2530/209; Y04S 10/126
See application file for complete search history.

(56) References Cited

U.S. PATENT DOCUMENTS

| | | | | |
|---|---|---|---|---|
| 10,384,555 B2* | 8/2019 | Maeda | ..................... | B60L 53/14 |
| 10,870,364 B2* | 12/2020 | Mere | ..................... | B60L 53/14 |
| 2009/0315512 A1 | 12/2009 | Ichikawa et al. | | |
| 2012/0016546 A1* | 1/2012 | Nilssen | ..................... | H02J 9/08 |
| | | | | 701/22 |
| 2014/0379155 A1* | 12/2014 | Niizuma | ............... | B60L 53/124 |
| | | | | 700/291 |
| 2017/0101023 A1 | 4/2017 | Nawata et al. | | |
| 2017/0140349 A1* | 5/2017 | Ricci | ..................... | B60L 53/36 |
| 2018/0019608 A1* | 1/2018 | Foldesi | ..................... | H02J 9/06 |
| 2019/0016312 A1* | 1/2019 | Carlson | ..................... | B60L 53/66 |
| 2019/0047433 A1* | 2/2019 | Rozman | ..................... | B60L 53/65 |
| 2019/0190299 A1* | 6/2019 | Mohamed | ..................... | H02J 50/12 |

FOREIGN PATENT DOCUMENTS

| | | | | | |
|---|---|---|---|---|---|
| DE | 102015012110 A1 | * | 4/2016 | ............ | B60L 3/0069 |
| EP | 3321121 A2 | * | 5/2018 | ............ | B60L 53/66 |
| JP | 02-142329 | | 5/1990 | | |
| JP | 2008-043040 | | 2/2008 | | |
| JP | 4412270 B2 | * | 2/2010 | | |
| JP | 2013-091377 | | 5/2013 | | |
| JP | 2013-119347 | | 6/2013 | | |
| JP | 2013130963 A | * | 7/2013 | | |
| JP | 2013243898 A | * | 12/2013 | | |
| JP | 2014090526 A | * | 5/2014 | | |
| JP | 2015-122892 | | 7/2015 | | |
| JP | 2015133769 A | * | 7/2015 | | |
| JP | 5758746 | | 8/2015 | | |
| JP | 2015-186985 | | 10/2015 | | |
| JP | 6401596 B2 | * | 10/2018 | | |
| WO | WO-2008015897 A1 | * | 2/2008 | ............ | B60L 11/123 |
| WO | WO-2019112586 A1 | * | 6/2019 | ............ | B60L 53/12 |

* cited by examiner

FIG. 5

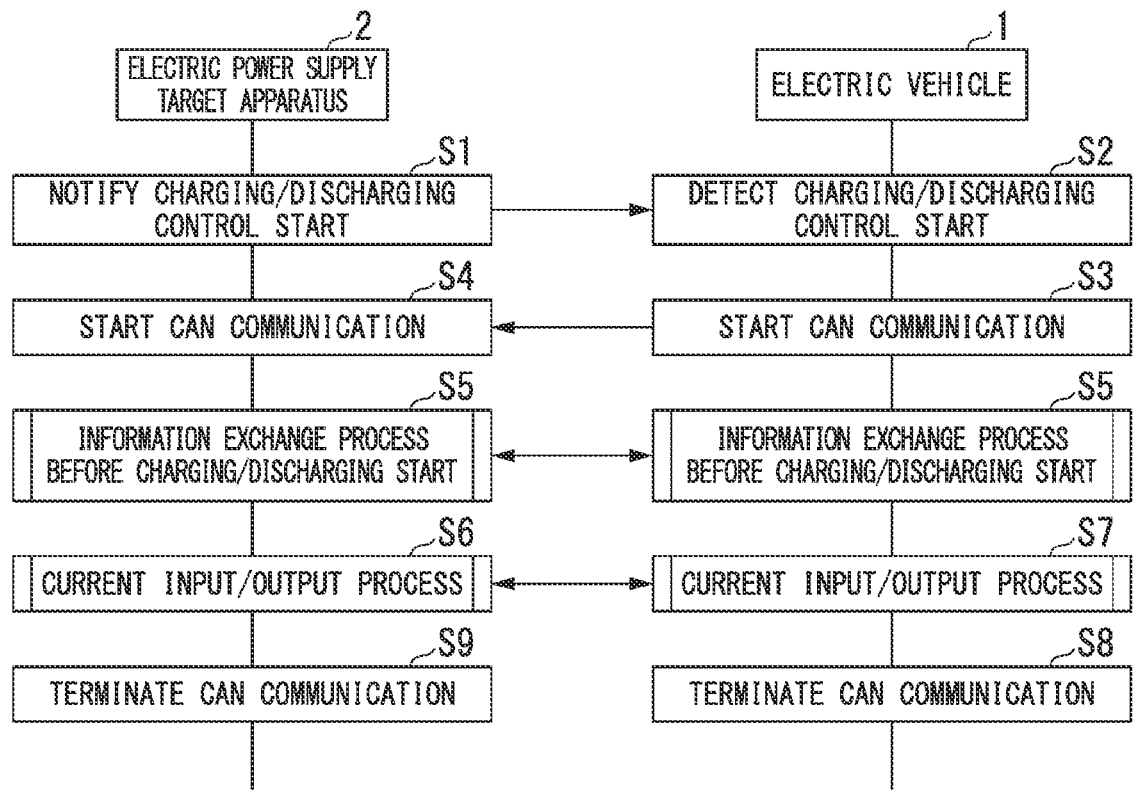

FIG. 6

| CATEGORY INFORMATION | PRESENCE OF INFORMATION, ABSENCE OF INFORMATION |
|---|---|
| EVPS OPERATION MODE | CATEGORY 0, CATEGORY 1, CATEGORY 2, CATEGORY 3 |
| EVPS GRID INTERCONNECTION CORRESPONDENCE INFORMATION | SECONDARY BATTERY GRID INTERCONNECTION CORRESPONDENCE, ELECTRIC POWER GENERATOR (INTERNAL COMBUSTION ENGINE) GRID INTERCONNECTION CORRESPONDENCE, ELECTRIC POWER GENERATOR (FUEL CELL) GRID INTERCONNECTION CORRESPONDENCE |

FIG. 7

| CHARGER INFORMATION | DISCHARGE CORRESPONDENCE FLAG | DISCHARGE NON-CORRESPONDENCE FLAG |
|---|---|---|

FIG. 8

| | CATEGORY CLASSIFICATION | EXPLANATION | CONNECTION DRAWING | CORRESPONDENCE TO TECHNICAL STANDARD | |
|---|---|---|---|---|---|
| | | | | EV ELECTRIC SUPPLY | ENG ELECTRIC SUPPLY |
| V2L | CATEGORY 0 | PERFORM ELECTRIC POWER SUPPLY DIRECTLY TO ELECTRICAL EQUIPMENT SEPARATELY FROM GRID BY ELECTRIC POWER CONVERTER THAT IS MADE FOR VEHICLE AND THAT IS NOT FIXED TO GROUND | 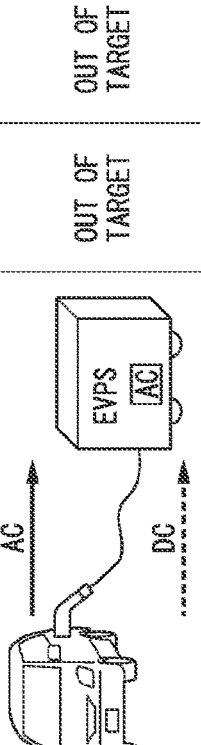 | OUT OF TARGET | OUT OF TARGET |
| | CATEGORY 1 (SELF-STANDING DEDICATED OUTLET) | SUPPLY ELECTRIC POWER TO DEDICATED OUTLET CONNECTED TO INDOOR WIRING PROVIDED IN HOME OR LIKE WITHOUT CONNECTION (GRID INTERCONNECTION) TO ELECTRIC POWER SYSTEM | 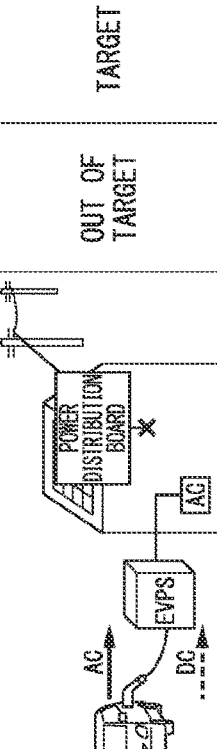 | OUT OF TARGET | TARGET |
| V2H | CATEGORY 2 (SWITCHING METHOD) | ELECTRIC VEHICLE OR LIKE AND ELECTRIC POWER SYSTEM DO NOT DIRECTLY CONNECT (DO NOT PERFORM GRID INTERCONNECTION) TO EACH OTHER, BUT PERFORM ELECTRIC POWER SUPPLY TO HOME OR LIKE FROM GRID, ELECTRIC VEHICLE, OR LIKE BY USING SWITCH | 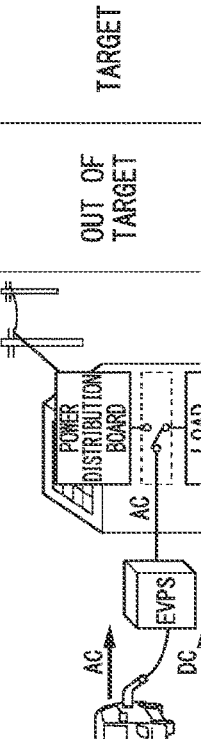 | OUT OF TARGET | TARGET |
| | CATEGORY 3 (GRID INTERCONNECTION (NO ADVERSE CURRENT)) | PERFORM CONNECTION (GRID INTERCONNECTION) TO ELECTRIC POWER SYSTEM VIA ELECTRIC POWER CONVERTER PROVIDED IN HOME OR LIKE AND SUPPLY ELECTRIC POWER TO INDOOR WIRING. HOWEVER, REVERSE FLOW OF ELECTRIC POWER TO GRID SIDE IS NOT PERFORMED | 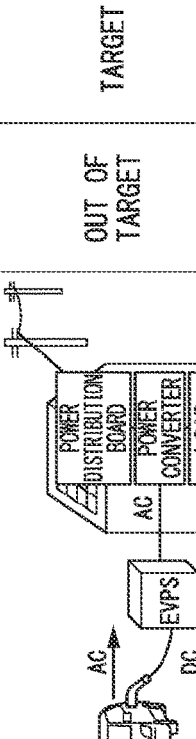 | OUT OF TARGET | TARGET |

ELECTRIC VEHICLE AND ELECTRIC VEHICLE CONTROL METHOD AUTOMATICALLY SELECTING POWER SUPPLIED TO OUTSIDE FROM ENGINE OR BATTERY OF ELECTRIC VEHICLE

TECHNICAL FIELD

The present invention relates to an electric vehicle and an electric vehicle control method.

Priority is claimed on Japanese Patent Application No. 2018-098039, filed on May 22, 2018, the contents of which are incorporated herein by reference.

BACKGROUND

A Vehicle-to-Home (V2H) system which uses electric power on a vehicle side as home electric power has been considered. The V2H is a system that supplies electricity stored in a vehicle to a home. In recent years, a PHEV (Plug-in Hybrid Electric Vehicle) vehicle on which an internal combustion engine and a high-capacity secondary battery for traveling are mounted and in which the vehicle battery can be directly charged using an attachment plug from an outlet has been considered. In such a PHEV, when performing an electric supply from the PHEV to the outside, there may be a situation in which it is desired to perform an "ENG electric supply" using electric power generated by the internal combustion engine in order to enable an electric supply to the outside for a long period of time.

As a method of supplying electric power on a vehicle side to a home using electric power generated by an internal combustion engine as described above, techniques described in Patent Document 1, Patent Document 2, and Patent Document 3 are disclosed.

In the technique described in Patent Document 1, an engine of a vehicle starts depending on whether or not a commercial power source supplied to a home from a power grid breaks down. In the technique described in Patent Document 1, an engine start command is generated "in a home".

In the technique described in Patent Document 2, a signal for performing an electric supply operation from an electric power storage device while allowing operation of an engine is generated in an "electric supply connector".

In the technique described in Patent Document 3, one of a HV electric supply mode and an EV electric supply mode is selected depending on a user operation. Here, the EV electric supply mode is an electric supply mode that supplies electric power only from the electric power storage device. The HV electric supply mode is an electric supply mode in which electric power from the electric power storage device and electric power generated by a rotation drive force of an engine are combined and supplied.

At the time of V2H connection in which an engine is driven and electric power is supplied to a home, it is necessary to deal with a ministerial ordinance (Ordinance of the Ministry of International Trade and Industry No. 51 of 1997) that defines a technical standard regarding thermal power facilities for electric power generation. On the other hand, at the time of V2H connection in which electric power stored in a secondary battery mounted on a vehicle is supplied to a home, it is not necessary to deal with the ministerial ordinance (Ordinance of the Ministry of International Trade and Industry No. 51 of 1997) that defines the technical standard regarding thermal power facilities for electric power generation.

RELATED ART DOCUMENTS

Patent Documents

[Patent Document 1]
  Japanese Unexamined Patent Application, First Publication No. H2-142329
[Patent Document 2]
  Japanese Patent No. 5758746
[Patent Document 3]
  Japanese Unexamined Patent Application, First Publication No. 2015-122892

SUMMARY OF INVENTION

Problems to be Solved by the Invention

However, in the techniques described in Patent Documents 1 to 3, since it is not possible to automatically select the electric supply system in accordance with a connected facility, it is necessary to deal with the ministerial ordinance (Ordinance of the Ministry of International Trade and Industry No. 51 of 1997) that defines the technical standard regarding thermal power facilities for electric power generation at the time of V2H connection.

In the techniques described in Patent Documents 1 to 3, it is undesirable to drive the engine and perform the ENG electric supply in a region where the idling stop ordinance is established.

An aspect of the present invention provides an electric vehicle and an electric vehicle control method that are capable of performing an optimum electric power supply without requiring a user's selection.

Means for Solving the Problem (1) An electric vehicle according to an aspect of the present invention is an electric vehicle that is able to supply electric power to a vehicle outside, the electric vehicle including: an electric power generation part; an electric power storage part; and a control part that performs control such that electric power supplied from the electric power generation part or electric power supplied from the electric power storage part is automatically selected on a vehicle side in response to information obtained from an electric power supply target apparatus at the vehicle outside, and an electric power supply to the electric power supply target apparatus is performed.

(2) In the above electric vehicle, the electric power generation part may be an engine, and the electric power storage part may be a battery.

(3) In the above electric vehicle, the control part may select an electric power supply from the electric power storage part in a case where the electric power supply target apparatus is other than a movable electric power converter.

(4) In the above electric vehicle, the control part may select an electric power supply from the electric power storage part in a case where the electric power supply target apparatus is provided in a home.

(5) In the above electric vehicle, the control part may select an electric power supply from the electric power storage part in a case where an electric supply is performed at a place where idling is regulated based on information obtained from the electric power supply target apparatus or position information of the electric vehicle.

(6) In the above electric vehicle, the control part may select an electric power supply of electric power generation by an engine which is the electric power generation part in a case where the electric power supply target apparatus is a movable electric power converter.

(7) In the above electric vehicle, the control part may switch to an electric power supply by a battery which is the electric power storage part and continue an electric supply in a case where electric power generation fails during an electric supply of electric power generation by an engine which is the electric power generation part.

(8) In the above electric vehicle, the control part may automatically switch an electric power supply by electric power generation of an engine which is the electric power generation part to an electric power supply by a battery which is the electric power storage part and perform an electric supply in a case where a remaining gasoline amount becomes a predetermined remaining amount.

(9) An electric vehicle control method according to another aspect of the present invention is an electric vehicle control method in an electric vehicle that includes an electric power generation part and an electric power storage part and that is able to supply electric power to a vehicle outside, the electric vehicle control method including a step in which a control part performs control such that electric power supplied from the electric power generation part or electric power supplied from the electric power storage part is automatically selected on a vehicle side in response to information obtained from an electric power supply target apparatus at the vehicle outside, and an electric power supply to the electric power supply target apparatus is performed.

Advantage of the Invention

According to (1) or (9) described above, since an optimum means is automatically selected on the vehicle side from a plurality of energy supply sources (engine, battery) on the basis of the information of the connected electric power supply target (V2H, V2L), it is possible to perform an optimum electric power supply without requiring a user's selection.

According to (2) described above, since the electric power supply by the engine electric power generation or the electric power supply by the battery is automatically selected on the vehicle side on the basis of the information of the connected electric power supply target (V2H, V2L), it is possible to perform an optimum electric power supply without requiring a user's selection. In a case where it is desired to prohibit the electric power supply by the engine electric power generation from the viewpoint of compliance with laws and regulations or the like, safety, and the like, the supply means is automatically selected on the vehicle side on the basis of the information of the electric power supply target, and therefore, it is possible to reliably select the electric power supply by the battery.

According to (3) described above, the electric power supply by the engine electric power generation becomes available at the time of a disaster, emergency, or the like where an electric power system cannot be used.

According to (4) described above, in a case where it is desired to prohibit the electric power supply by the engine electric power generation to an electric power system of a home or the like from the viewpoint of compliance with laws and regulations or the like, safety, and the like, the supply means is automatically selected on the vehicle side on the basis of the information of the electric power supply target, and therefore, it is possible to reliably select the electric power supply by the battery.

According to (5) described above, in a region where the idling stop ordinance is present, the electric supply by the engine is prohibited, and it is possible to reliably select the electric power supply by the battery. Further, according to (5) described above, an electric supply in conformity to laws and regulations or the area characteristic without requiring a user's selection becomes available.

According to (6) described above, in a case where the electric power supply target is the movable electric power converter, the electric power supply by the engine electric power generation is selected, and therefore, an electric supply for a longer period of time becomes available.

According to (7) described above, in a case where electric power generation becomes difficult for some reason during an engine electric supply, since the engine electric supply can be switched to the electric power supply from the battery, it is possible to continue the electric supply without interruption.

According to (8) described above, even when the fuel becomes less than a predetermined value during an engine electric supply, since the engine electric supply can be switched to the electric power supply from the battery, it is possible to continue the electric supply without interruption.

BRIEF DESCRIPTION OF THE DRAWINGS

FIG. 5 is a sequence view of an electric supply process procedure of the electric vehicle and an electric power supply target apparatus according to the embodiment.

FIG. 6 is a view showing an information example regarding the electric power supply target apparatus according to the embodiment.

FIG. 7 is a view showing charger information of the information example regarding the electric power supply target apparatus according to the embodiment.

FIG. 8 is a view showing a relationship between a ministerial ordinance that defines a technical standard regarding thermal power facilities for electric power generation and an electric power supply method from an electric vehicle.

DESCRIPTION OF THE EMBODIMENTS

Hereinafter, an embodiment of the present invention will be described with reference to the drawings. An electric vehicle of the embodiment is, for example, a PHEV (Plug-in Hybrid Electric Vehicle) or a FCV (Fuel Cell Vehicle).

<Configuration of Electric Vehicle>

Figure 1:
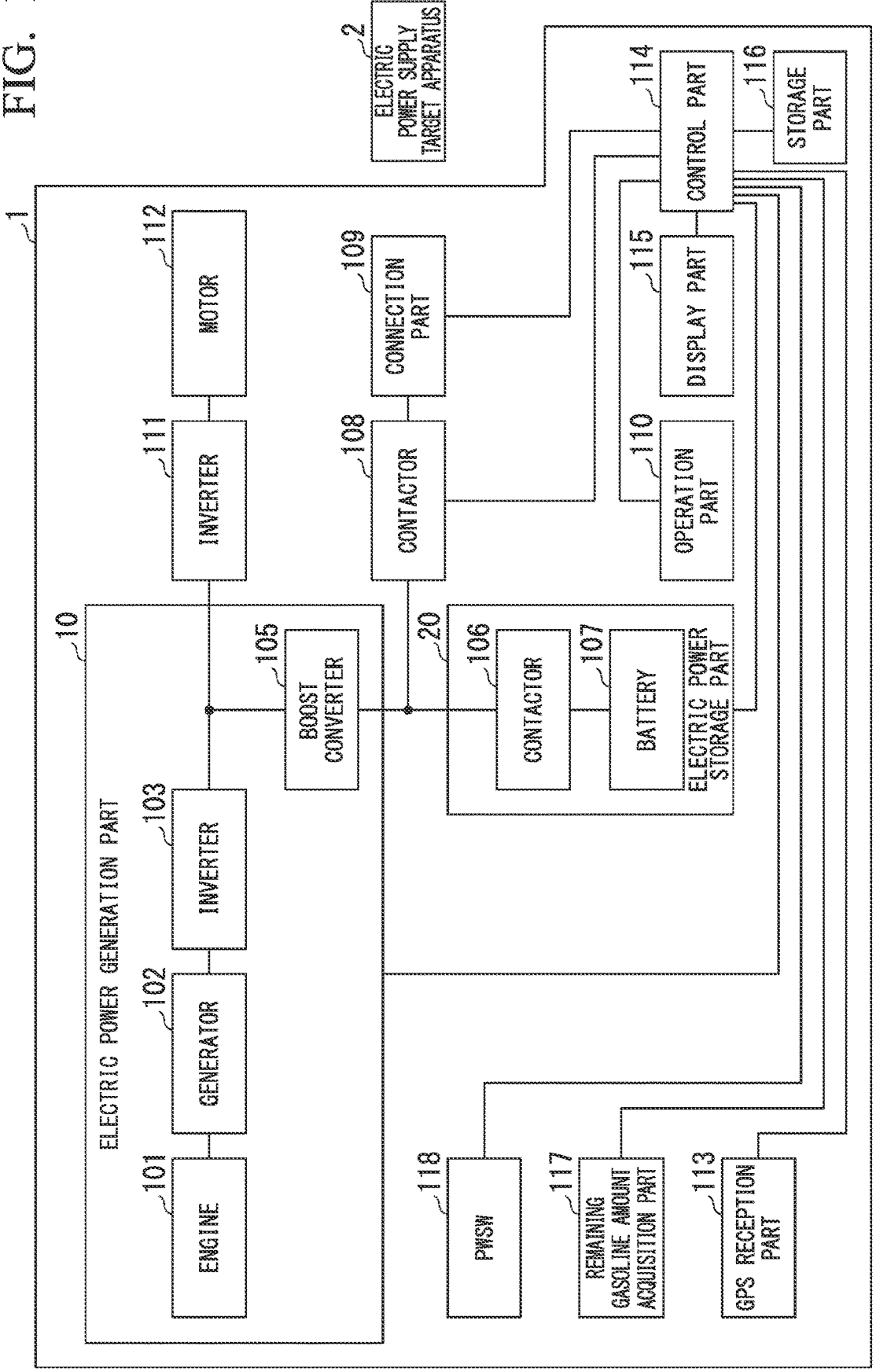
FIG. 1 is a block diagram showing a configuration example of an electric vehicle according to an embodiment.
Figure 2:
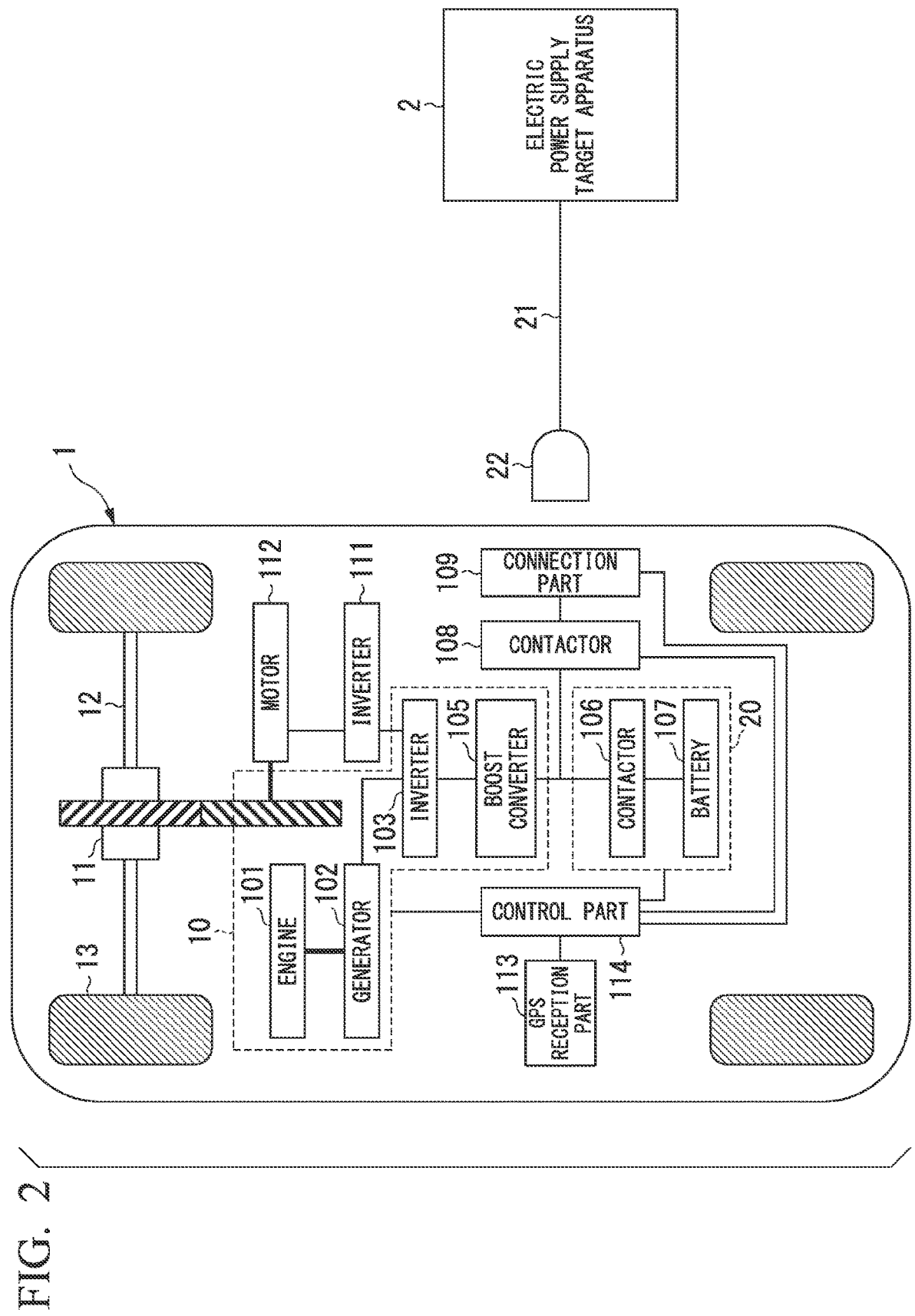
FIG. 2 is a block diagram showing an internal configuration example of the electric vehicle according to the embodiment.

FIG. 1 is a block diagram showing a configuration example of an electric vehicle 1 according to the embodiment. FIG. 2 is a block diagram showing an internal configuration example of the electric vehicle 1 according to the embodiment. In FIG. 2, main components shown in FIG. 1 are shown, and some components are omitted.

The electric vehicle 1 shown in FIG. 1 and FIG. 2 is a PHEV. As shown in FIG. 1, the electric vehicle 1 includes an electric power generation part 10, an electric power storage part 20, a contactor 108, a connection part 109, an operation part 110, an inverter 111, a motor 112, a GPS reception part 113, a control part 114, a display part 115, a storage part 116, a remaining gasoline amount acquisition part 117, and a PWSW 118. In FIG. 1, a mechanism, a wheel, and the like are omitted. The components are connected to one another, for example, by a CAN (Controller Area Network) Bus.

The electric power generation part 10 includes an engine 101, a generator 102, an inverter 103, and a boost converter 105.

The electric power storage part 20 includes a contactor 106 and a battery 107.

The following embodiment is described using an example in which the electric vehicle 1 and an electric power supply target apparatus 2 comply with, for example, the "Guideline for Charge and Discharge System for Electric Vehicle" of the electric vehicle electric power supply system council association, which is an electric vehicle charging/discharging standard. The embodiment is described using an example in which a communication protocol is, for example, the CAN. The electric vehicle charging/discharging standard and the communication protocol are examples, and the embodiment is not limited thereto.

<Component of Electric Vehicle>

The electric vehicle 1 travels by driving a drive shaft 12 (FIG. 2) via a gearbox 11 (FIG. 2) and rotating a wheel 13 (FIG. 2) by stopping the engine 101 and driving the motor 112 using electric power of the electric power storage part 20, for example, at the time of starting or at the time of traveling at a low or medium speed. The electric vehicle 1 rotates the wheel 13 and travels by driving the engine 101 by fuel (not shown) at the time of ordinary travel and simultaneously rotating the motor 112 by electric power generated by the generator 102 on the basis of the power of the engine 101. The electric vehicle 1 charges the battery 107 with regeneration energy generated by the generator 102 on the basis of rotation of the wheel 13 at the time of deceleration or at the time of braking. The electric vehicle 1 charges the battery 107 with electric power generated by the generator 102 by starting the engine 101 when the charge amount of the battery 107 becomes low.

When the electric power supply target apparatus 2 that supplies electric power is connected, the electric vehicle 1 selects one of electric power generated by the electric power generation part 10 and electric power stored in the electric power storage part 20 on the basis of information obtained from the connected electric power supply target apparatus 2 or information obtained from the GPS reception part 113, and supplies the selected electric power to the electric power supply target apparatus 2. A selection method is described later. When the electric power supply target apparatus 2 is connected, the electric vehicle 1 stores the electric power supplied from the electric power supply target apparatus 2 in the electric power storage part 20.

The electric power supply target apparatus 2 is, for example, an EVPS (Electric Vehicle Power System) and is a V2L (Vehicle-to-Load) device, or a V2H (Vehicle-to-Home). As shown in FIG. 2, the electric power supply target apparatus 2 includes a cable 21 and a connector 22. The electric power supply target apparatus 2 includes a control part, a storage part, an AC-DC converter, a DC-AC converter, an operation part, a display part, and the like (not shown). The electric power supply target apparatus 2 may include a battery. When connected to the electric vehicle 1, the electric power supply target apparatus 2 outputs information regarding the electric power supply target apparatus 2 to the electric vehicle 1. The information regarding the electric power supply target apparatus 2 is described later. When connected to the electric vehicle 1, the electric power supply target apparatus 2 receives electric power from the electric vehicle 1. In a case where the electric power supply target apparatus 2 is a V2H correspondence facility, the electric power supply target apparatus 2 supplies the supplied electric power, for example, to a home or the like. At the time of an electric supply to the electric vehicle 1, the electric power supply target apparatus 2 supplies electric power to the electric vehicle 1.

At the time of traveling, the electric power generation part 10 rotates the wheel 13 by driving the engine 101 or the motor 112 in response to control of the control part 114. At the time of charging to the electric power storage part 20, the electric power generation part 10 supplies electric power to the electric power storage part 20 in response to control of the control part 114. When supplying electric power to the electric power supply target apparatus 2, the electric power generation part 10 supplies electric power to the electric power supply target apparatus 2 in response to control of the control part 114. The electric power generation part 10 may be an internal combustion engine, a fuel cell, a solar cell, or the like.

The engine 101 is a power source and drives the wheel 13 using fuel (for example, gasoline) (not shown) as power in response to control of the control part 114.

The generator 102 is an electricity generator and is, for example, an AC synchronization motor. The generator 102 generates electric power by the rotation of the wheel 13 driven by the engine 101 or the rotation of the wheel 13 at the time of deceleration. The generator 102 outputs the generated electric power to the inverter 103.

The inverter 103 is a PDU (Power Drive Unit), converts a DC current supplied from the electric power storage part 20 into an AC current, and supplies the converted AC current to the motor 112. The inverter 103 converts an AC current generated by the generator 102 into a DC current and outputs the converted DC current to the electric power storage part 20. When supplying electric power to the electric power supply target apparatus 2, the inverter 103 outputs the converted DC current to the contactor 108 in response to control of the control part 114.

The motor 112 is a traction motor and is, for example, an AC synchronization motor. The motor 112 rotates the wheel 13 using electric power of the battery 107 as power in response to control of the control part 114.

The boost converter 105 is a voltage control unit (VCU). The boost converter 105 boosts a voltage value of the battery 107 that is output by the electric power storage part 20 and supplies a boosted DC current to the motor 112.

At the time of storing electric power, the electric power storage part 20 stores a current that is supplied from the electric power generation part 10 in the battery 107 in response to control of the control part 114. At the time of traveling, the electric power storage part 20 supplies, to the electric power generation part 10, the electric power that is stored by the battery 107 in response to control of the control part 114. When supplying electric power to the electric power supply target apparatus 2, the electric power storage part 20 outputs the electric power stored by the battery 107 to the contactor 108 in response to control of the control part 114. When receiving a supply of electric power from the electric power supply target apparatus 2, the electric power storage part 20 stores the electric power that is supplied from the electric power supply target apparatus 2 in the battery 107 in response to control of the control part 114.

The contactor 106 is, for example, an electromagnetic switch and controls the storing of electric power to the battery 107 and the supply of electric power from the battery 107 in response to control of the control part 114.

The battery 107 is, for example, a battery such as a high-capacity secondary battery, an all solid battery, or a high-capacity capacitor.

The contactor 108 is, for example, an electromagnetic switch and controls the supply of electric power from the electric power storage part 20 to the electric power supply target apparatus 2 and the supply of electric power from the electric power supply target apparatus 2 to the electric power storage part 20 in response to control of the control part 114 when supplying electric power to the electric power supply target apparatus 2.

The connection part 109 is a connection terminal with the electric power supply target apparatus 2. The connection part 109 includes an electric power source line, a control signal line, and a CAN Bus signal line. A connector 22 (a quick-charge connector; FIG. 2) of the electric power supply target apparatus 2 is connected to the connection part 109.

The operation part 110 is, for example, a touch panel sensor provided on the display part 115, detects an operation result of an operation by a user, and outputs the detected operation result to the control part 114.

The inverter 111 is a PDU, converts a voltage value of a voltage supplied from the electric power generation part 10 into a voltage value that is suitable for the motor 112, and supplies the converted voltage to the motor 112.

The GPS reception part 113 receives positioning information from the GPS (Global Positioning System) and outputs the received positioning information to the control part 114.

The display part 115 is, for example, a liquid crystal display device, an organic EL (Electro Luminescence) display device, an electronic ink display device, or the like. The display part 115 displays information that is output by the control part 114.

The control part 114 is, for example, an ECU (Electronic Control Unit) and performs control of each component of the electric vehicle 1, control of a traveling state, control of the storing of electric power to the electric power storage part 20, and the like at the time of traveling.

The control part 114 acquires information regarding the electric power supply target apparatus 2 from the connected electric power supply target apparatus 2 when the electric power supply target apparatus 2 is connected. Alternatively, the control part 114 acquires positioning information that is output by the GPS reception part 113 when the electric power supply target apparatus 2 is connected. The control part 114 performs control such that one of the electric power generated by the electric power generation part 10 and the electric power stored in the electric power storage part 20 is selected and is supplied to the electric power supply target apparatus 2 on the basis of the information stored by the storage part 116 and at least one of the information regarding the electric power supply target apparatus 2 and the positioning information.

The control part 114 performs control such that the electric power supplied from the electric power supply target apparatus 2 is stored in the electric power storage part 20 in a case where the electric power supply target apparatus 2 is connected.

The control part 114 compares a remaining gasoline amount that is output by the remaining gasoline amount acquisition part 117 with a threshold value that is stored by the storage part 116 in a case where the electric power supply target apparatus 2 is connected. Then, in a case where the remaining gasoline amount becomes a predetermined remaining amount, the control part 114 automatically switches the electric power supply by the engine electric power generation to the electric power supply by the battery and supplies electric power to the electric power supply target apparatus 2.

The control part 114 determines whether the PWSW 118 is in an ON state or is in an OFF state.

The control part 114 acquires an operation state of the electric power generation part 10 from the electric power generation part 10 and determines whether or not electric power generation by the engine 101 is performable.

The storage part 116 stores information regarding the electric power supply target apparatus 2. The storage part 116 stores a large variety of threshold values. The storage part 116 stores information of an area where idling is prohibited or the like. The storage part 116 stores information regarding the electric vehicle 1. The information regarding the electric vehicle 1 includes the presence or absence of vehicle information, the type of a vehicle electric power supply source, and grid interconnection correspondence information of the vehicle electric power supply source. The type of the vehicle electric power supply source includes information indicating whether or not a secondary battery is included, information indicating whether or not an internal combustion engine is included, and information indicating whether or not a fuel cell is included. The grid interconnection correspondence information of the vehicle electric power supply source includes information indicating whether or not the secondary battery corresponds to a grid interconnection, information indicating whether or not the internal combustion engine corresponds to the grid interconnection, and information indicating whether or not the fuel cell corresponds to the grid interconnection.

The remaining gasoline amount acquisition part 117 acquires an amount of gasoline remaining in the electric vehicle 1 and outputs the acquired remaining amount of gasoline to the control part 114.

The PWSW 118 is a start switch and may be, for example, a reader by a short-range communication, an ignition key, or the like.

<Electric Supply of Electric Vehicle>

Next, an electric supply method to the electric power supply target apparatus 2 from the electric vehicle 1 is described. The electric supply mode includes an ENG (engine) electric supply mode and an EV (electric vehicle) electric supply mode.

Figure 3:
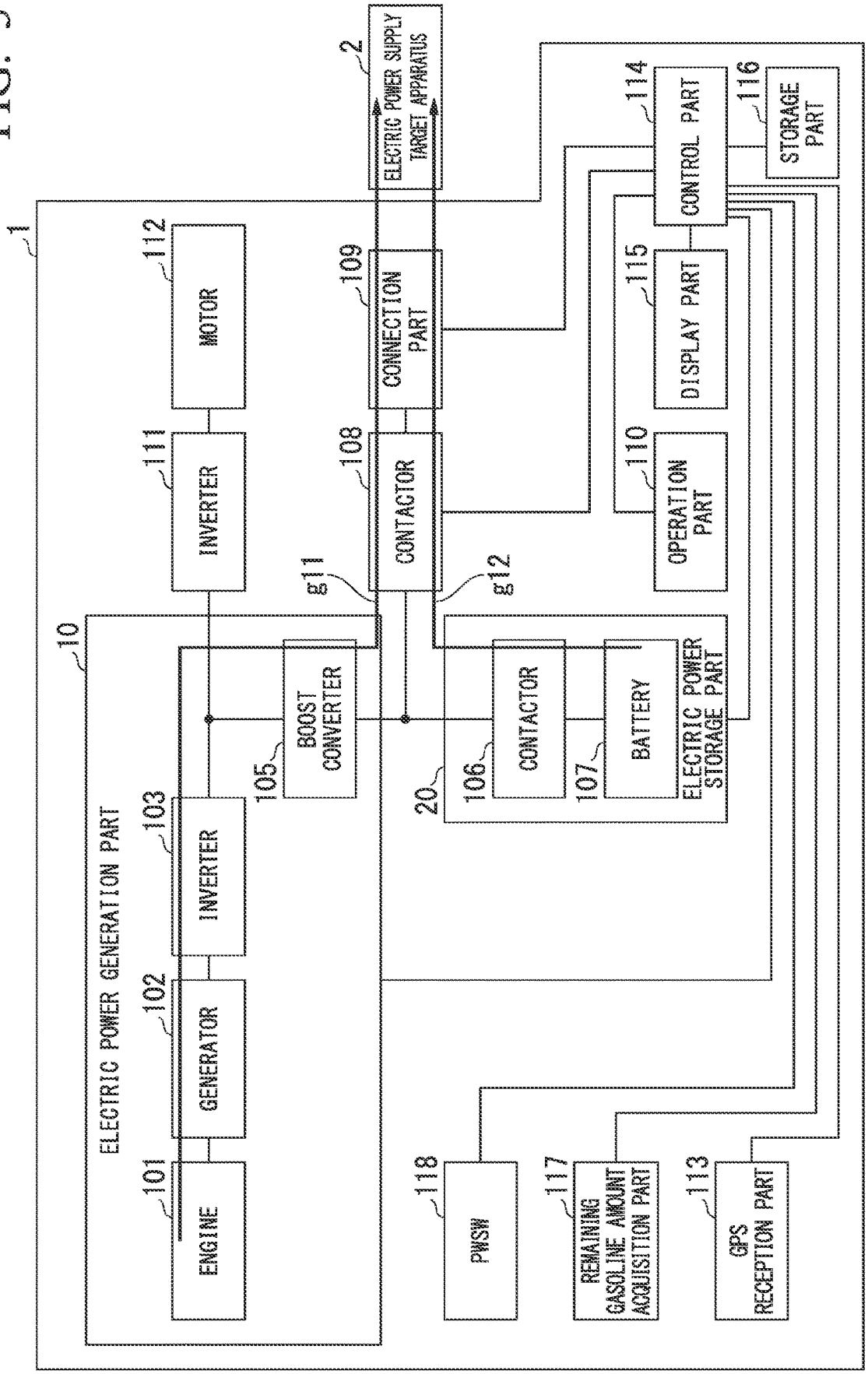
FIG. 3 is a view showing an example of an electric supply path of an ENG electric supply mode according to the embodiment.

First, the ENG electric supply mode is described. FIG. 3 is a view showing an example of an electric supply path of the ENG electric supply mode according to the embodiment.

As shown in FIG. 3, in the ENG electric supply mode, the engine 101 of the electric power generation part 10 is operated, and electric power (a path g11) generated by the electric power generation part 10 and electric power (a path g12) stored by the electric power storage part 20 are supplied to the electric power supply target apparatus 2. Thereby, an electric supply for a long period of time is enabled in the ENG electric supply mode. The control part 114 supplies electric power to the electric power supply target apparatus 2 only from the electric power (the path g11) generated by the electric power generation part 10 in a case where an electric power storage amount of the battery 107 is less than a predetermined value.

Figure 4:
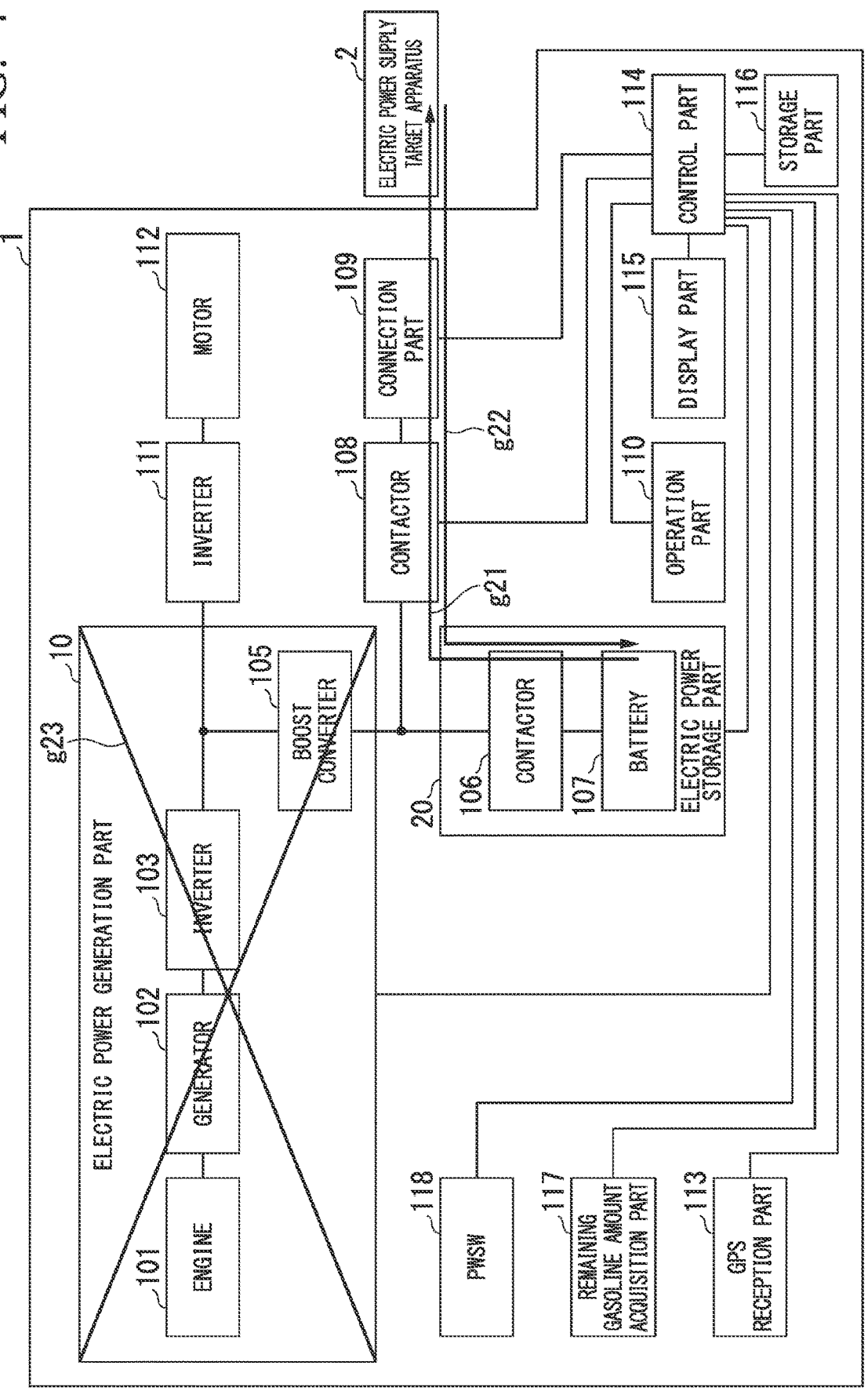
FIG. 4 is a view showing an example of an electric supply path of an EV electric supply mode according to the embodiment.

Next, the EV electric supply mode is described. FIG. 4 is a view showing an example of an electric supply path of the EV electric supply mode according to the embodiment.

As shown in FIG. 4, in the EV electric supply mode, the operation of the electric power generation part 10 is stopped as indicated by a cross mark g23, and the electric power (a path g21) stored by the electric power storage part 20 is supplied to the electric power supply target apparatus 2. Thereby, in the EV electric supply mode, an electric supply from the electric vehicle 1 is enabled even under a condition of restriction of zero exhaust gas. In a case where an electric power storage amount of the battery 107 is less than a predetermined value, the control part 114 stores the electric power supplied by the electric power supply target apparatus 2 in the electric power storage part 20 by a path g22.

<Procedure of Electric Supply Process of Electric Vehicle and Electric Power Supply Target Apparatus>

Next, a procedure example of an electric supply process of the electric vehicle 1 and the electric power supply target apparatus 2 is described. FIG. 5 is a sequence view of an electric supply process procedure of the electric vehicle 1 and the electric power supply target apparatus 2 according to the embodiment. Prior to the following process, a user connects the connector 22 of the electric power supply target apparatus 2 to the electric vehicle 1. Subsequently, the user operates the PWSW 118 of the electric vehicle 1 to be in an ON state. The user operates the electric power supply target apparatus 2 to be in an ON state.

(Step S1) The electric power supply target apparatus 2 notifies the electric vehicle 1 of a charging/discharging control start through the cable 21.

(Step S2) The control part 114 of the electric vehicle 1 detects the notified charging/discharging control start.

(Step S3) The control part 114 of the electric vehicle 1 starts a CAN communication.

(Step S4) The electric power supply target apparatus 2 starts the CAN communication.

(Step S5) The control part 114 of the electric vehicle 1 and the electric power supply target apparatus 2 perform an information exchange process before the charging/discharging start. For example, the control part 114 of the electric vehicle 1 transmits information regarding the electric vehicle 1 to the electric power supply target apparatus 2 via the CAN communication. The electric power supply target apparatus 2 transmits information regarding the electric power supply target apparatus 2 to the electric vehicle 1 via the CAN communication. The process of Step S5 will be described later with reference to FIG. 8.

(Step S6) The electric power supply target apparatus 2 starts a current input/output process with the electric vehicle 1 on the basis of the information exchange process before the charging/discharging start.

(Step S7) The control part 114 of the electric vehicle 1 starts the current input/output process with the electric power supply target apparatus 2 on the basis of the information exchange process before the charging/discharging start. The control part 114 controls the contactor 106 and the contactor 108, for example, to acquire a current supplied from the electric power supply target apparatus 2 and perform charging to the battery 107.

(Step S8) When the current input/output process is completed, the control part 114 of the electric vehicle 1 controls the contactor 108 to be in an open state (OFF state) and terminates the CAN communication.

(Step S9) The electric power supply target apparatus 2 terminates the CAN communication when the current input/output process is completed.

The process example described above is an example, and the embodiment is not limited thereto.

<Information Regarding Electric Power Supply Target Apparatus>

Next, an example of information regarding the electric power supply target apparatus 2 is described with reference to FIG. 6 and FIG. 7.

FIG. 6 is a view showing an example of information regarding the electric power supply target apparatus 2 according to the embodiment. As shown in FIG. 6, the information regarding the electric power supply target apparatus 2 includes category information, an EVPS operation mode, and EVPS grid interconnection correspondence information.

The category information represents the presence of information regarding the electric power supply target apparatus 2 or the absence of information regarding the electric power supply target apparatus 2.

The EVPS operation mode represents correspondence to or non-correspondence to category 0, category 1, category 2, or category 3.

The EVPS grid interconnection correspondence information represents correspondence to or non-correspondence to a secondary battery grid interconnection, correspondence to or non-correspondence to an electric power generator (internal combustion engine) grid interconnection, and correspondence to or non-correspondence to an electric power generator (fuel cell) grid interconnection.

FIG. 7 is a view showing charger information of the information example regarding the electric power supply target apparatus 2 according to the embodiment. As shown in FIG. 7, discharger information represents information indicating a discharge correspondence flag or information indicating a discharge non-correspondence flag.

<Ministerial Ordinance that Defines Technical Standard Regarding Thermal Power Facilities for Electric Power Generation>

A relationship between a ministerial ordinance (Ordinance of the Ministry of International Trade and Industry No. 51 of 1997) that defines a technical standard regarding thermal power facilities for electric power generation and an electric power supply method from an electric vehicle in a case where electric power is supplied from the electric vehicle is described. FIG. 8 is a view showing a relationship between the ministerial ordinance that defines a technical standard regarding thermal power facilities for electric power generation and an electric power supply method from an electric vehicle.

In a case of the V2L (Vehicle-to-Load), which is a system that supplies electricity from a vehicle to electrical equipment, the category is classified as category 0. Category 0 is a connection and supply method that performs an electric power supply from the vehicle to the electrical equipment separately from a grid by an electric power converter that is made for the vehicle and that is not fixed to the ground.

In a case of the V2H (Vehicle-to-Home), which is a system that supplies electricity stored in a vehicle to a home, the category is classified as category 1, 2, or 3. Category 1 is a self-standing dedicated outlet system which does not connect the vehicle directly to the electric power system (does not perform the grid interconnection), connects the vehicle to the electric power converter, and performs an electric power supply to the electric power converter. Category 1 is a connection and supply method that supplies electric power to a dedicated outlet connected to an indoor wiring provided in a home or the like from the electric power converter.

Categories 2 and 3 connect the vehicle to the electric power converter and perform an electric power supply to the electric power converter, but do not directly connect (do not perform the grid interconnection) the electric power system supplied from the vehicle. Category 2 is a switching method and is a connection and supply method that performs an electric power supply to a home or the like by switching, using a switch, between the electric power system and the electric power supplied from the vehicle. Category 3 is a grid interconnection (no adverse current) system, performs a connection (grid interconnection) to the electric power system via an electric power converter provided in a home or the like, and supplies electric power to the indoor wiring. However, in category 3, the reverse flow of electric power to the grid side is not performed.

That is, in the case of categories 1 to 3, the electric power supply target apparatus 2 is provided in the home or the like.

The correspondence among each category, the electric supply method, and the technical standard (hereinafter, referred to as the technical standard) regarding thermal power facilities for electric power generation is described.

In the case of category 0, both the EV electric supply and the ENG electric supply are not subject to the technical standard.

In the cases of categories 1-3, the EV electric supply is not subject to the technical standard, and the ENG electric supply is subject to the technical standard.

<Information Exchange Process Before Charging/Discharging Start>

From the relationship shown in FIG. 8, there is a case that is subject to the technical standard and a case that is not subject to the technical standard depending on the category of the electric power supply target apparatus 2. Therefore, in order to comply with the technical standard, it is preferable to prohibit the ENG electric supply at the time of the V2H connection. From the viewpoint of energy efficiency, it is preferable to perform the EV electric supply at the time of the V2H connection. In a case of a vehicle having a low battery capacity and capable of performing the ENG electric power generation compared to the EV such as the PHEV, it is preferable to perform the ENG electric supply at the time of the V2L connection from the viewpoint of electric supply for a long period of time.

Therefore, in the embodiment, when the electric power supply target apparatus 2 is connected to the electric vehicle 1, the information exchange process is performed before the charging/discharging start in Step S5 (FIG. 5) before the charging/discharging is performed, and performing of the EV electric supply and performing of the ENG electric supply are switched on the electric vehicle 1 side.

Figure 9:
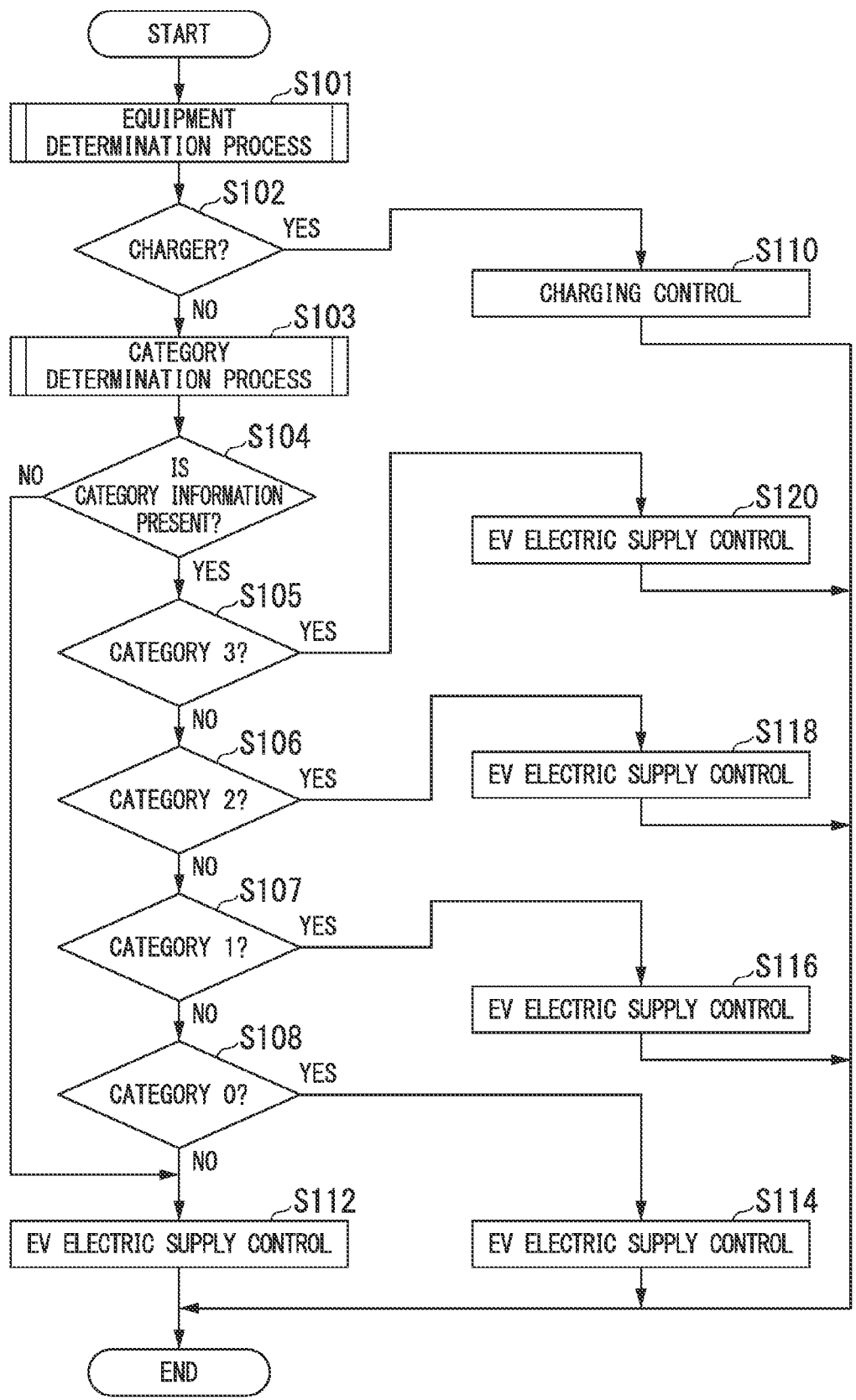
FIG. 9 is a flowchart of an example of a process procedure of information exchange before the start of charging/discharging according to the embodiment.

FIG. 9 is a flowchart of an example of a process procedure of information exchange before the charging/discharging start according to the embodiment.

(Step S101) The control part 114 starts an equipment determination process on the basis of the received information regarding the electric power supply target apparatus 2.

(Step S102) The control part 114 determines whether the charger information is the discharge correspondence flag or the discharge non-correspondence flag. In a case where it is determined that the charger information is the discharge correspondence flag (Step S102; YES), the control part 114 proceeds to the process of Step S110. In a case where it is determined that the charger information is the discharge non-correspondence flag (Step S102; NO), the control part 114 proceeds to the process of Step S103.

(Step S103) The control part 114 extracts category information included in the information acquired from the electric power supply target apparatus 2 and performs a determination process.

(Step S104) The control part 114 determines whether or not the category information is present.

In a case where it is determined that the category information is present (Step S104; YES), the control part 114 proceeds to the process of Step S105, and in a case where it is determined that the category information is absent (Step S104; NO), the control part 114 proceeds to the process of Step S112.

(Step S105) The control part 114 determines whether or not the category is category 3. In a case where it is determined that the category is category 3 (Step S105; YES), the control part 114 proceeds to the process of Step S120, and in a case where it is determined that the category is not category 3 (Step S105; NO), the control part 114 proceeds to the process of Step S106.

(Step S106) The control part 114 determines whether or not the category is category 2. In a case where it is determined that the category is category 2 (Step S106; YES), the control part 114 proceeds to the process of Step S118, and in a case where it is determined that the category is not category 2 (Step S106; NO), the control part 114 proceeds to the process to Step S107.

(Step S107) The control part 114 determines whether or not the category is category 1. In a case where it is determined that the category is category 1 (Step S107; YES), the control part 114 proceeds to the process of Step S116, and in a case where it is determined that the category is not category 1 (Step S107; NO), the control part 114 proceeds to the process of Step S108.

(Step S108) The control part 114 determines whether or not the category is category 0. In a case where it is determined that the category is category 0 (Step S108; YES), the control part 114 proceeds to the process of Step S114, and in a case where it is determined that the category is not category 0 (Step S108; NO), the control part 114 proceeds to the process of Step S112.

(Step S110) The control part 114 performs control such that charging control is performed.

(Step S112) The control part 114 performs control such that the EV electric supply is performed.

(Step S114) The control part 114 performs control such that the ENG electric supply is performed.

(Step S116) The control part 114 performs control such that the EV electric supply is performed.

(Step S118) The control part 114 performs control such that the EV electric supply is performed.

(Step S120) The control part 114 performs control such that the EV electric supply is performed.

The control part 114 proceeds to the process of Step S6 (FIG. 5) after the process of Step S110, S112, S114, S116, S118, or S120 is completed.

In this way, in FIG. 9, in a case where the category is category 1, 2, or 3, the electric power supply target apparatus 2 is provided in a home or the like, and therefore, the control part 114 performs the EV electric supply.

The example shown in FIG. 9 shows an example in which a protocol is an electric vehicle charging/discharging system guideline; however, a communication protocol between the electric vehicle 1 and the electric power supply target apparatus 2 is not limited thereto and may be another protocol. Even in such a case, the electric vehicle 1 switches between the EV electric supply and ENG electric supply so as to conform to laws and regulations on the basis of the acquired information.

As described above, in the embodiment, before starting charging/discharging between the electric vehicle 1 and the electric power supply target apparatus 2, the electric vehicle 1 acquires information regarding the electric power supply target apparatus 2. The electric vehicle 1 switches between the EV electric supply and the ENG electric supply on the basis of the category included in the acquired information.

Thereby, in the embodiment, it is possible to conform to the ministerial ordinance that defines the technical standard regarding thermal power facilities for electric power generation.

As described above, in the embodiment, the control part 114 selects an electric power supply from the electric power storage part 20 in a case where the electric power supply target apparatus 2 is provided in a home.

Thereby, according to the embodiment, in a case where it is desired to prohibit the electric power supply by the engine electric power generation to an electric power system of a home or the like from the viewpoint of conformity to laws and regulations or the like, safety, and the like, the supply means is automatically selected on the vehicle side on the basis of the information of the electric power supply target, and therefore, it is possible to reliably select the electric power supply by the battery 107.

In the embodiment, the control part 114 selects an electric power supply of electric power generation by the engine 101 in a case where the electric power supply target apparatus 2 is a movable electric power converter.

Thereby, according to the embodiment, the electric power supply by the electric power generation by the engine 101 becomes available at the time of a disaster, emergency, or the like where the electric power system cannot be used.

First Modified Example

In the embodiment described above, the electric vehicle 1 switches between the EV electric supply and the ENG electric supply on the basis of the information regarding the electric power supply target apparatus 2. A first modified example is described using an example that switches between the EV electric supply and the ENG electric supply using position information based on information received by the GPS reception part 113. The configuration of the electric vehicle 1 is the same as that of FIG. 1.

In recent years, there have been prefectures and districts in which the idling stop is required due to ordinances. The term "idling stop" refers to stopping an engine at the time of stopping or parking of a vehicle or the like.

In this way, in an area where the idling stop is required, in order to conform to the ordinances, it is necessary for the electric vehicle 1 to perform control such that the ENG electric supply is not performed.

Figure 10:
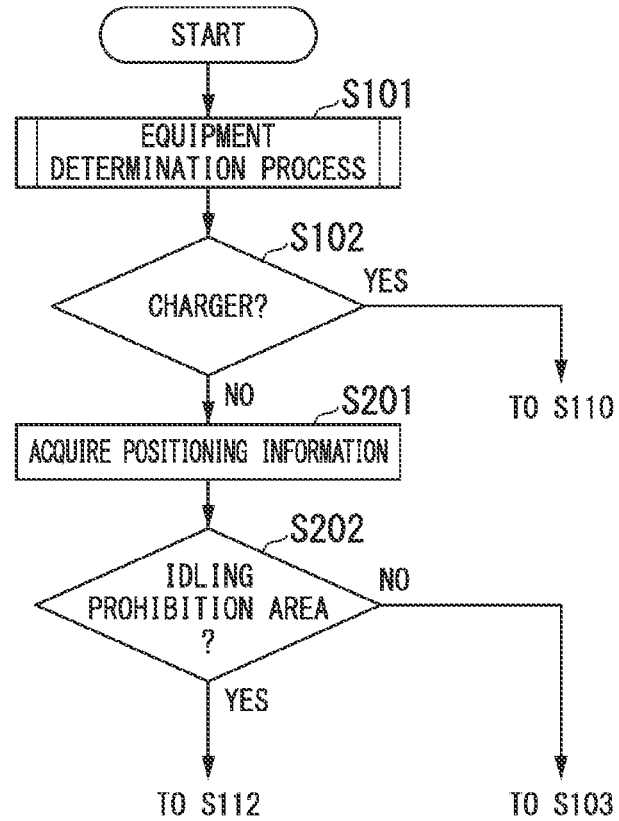
FIG. 10 is a flowchart of an example of a process procedure of information exchange before the start of charging/discharging according to a first modified example of the embodiment.

FIG. 10 is a flowchart of an example of a process procedure of information exchange before the start of charging/discharging according to the first modified example of the embodiment. The electric vehicle 1 performs the following processes after the process of Step S102 of FIG. 9.

(Steps S101 and S102) The control part 114 starts an equipment determination process on the basis of the received information regarding the electric power supply target apparatus 2. Subsequently, the control part 114 determines whether the charger information is a discharge correspondence flag or is a discharge non-correspondence flag. In a case where it is determined that the charger information is a discharge correspondence flag (Step S102; YES), the control part 114 proceeds to the process of Step S110 similarly to FIG. 9. In a case where it is determined that the charger information is a discharge non-correspondence flag (Step S102; NO), the control part 114 proceeds to the process of Step S201.

(Step S201) The control part 114 acquires the positioning information received by the GPS reception part 113. Subsequently, the control part 114 obtains present positioning information on the basis of the acquired positioning information.

(Step S202) The control part 114 determines whether or not the present position is in an area where an idling stop ordinance is present, which is an area where idling is prohibited on the basis of the obtained present position and the information stored by the storage part 116. In a case where it is determined that the present position is in an area where idling is prohibited (Step S202; YES), the control part 114 proceeds to the process of Step S112 (FIG. 9), and in a case where it is determined that the present position is not in an area where idling is prohibited (Step S202; NO), the control part 114 proceeds to the process of Step S103 (FIG. 9).

The process shown in FIG. 10 is an example and is not limited thereto. The control part 114 may perform the processes of Steps S201 and S202 between the processes of Step S108 and Step S114, for example, in FIG. 9. In this case, when it is determined that the present position is in an area where idling is prohibited (Step S202; YES), the control part 114 may proceed to the process of Step S112 (FIG. 9), and when it is determined that the present position is not in an area where idling is prohibited (Step S202; NO), the control part 114 may proceed to the process of Step S114 (FIG. 9).

In the first modified example, the EV electric supply is performed in an area where the idling stop ordinance is present on the basis of the present position based on the positioning information received by the GPS reception part 113 and the information stored by the storage part 116.

Thereby, according to the first modified example, it is possible to prohibit the ENG electric supply in a region where the idling stop ordinance is present. As a result, according to the first modified example, in a region where the idling stop ordinance is present, the ENG electric supply is prohibited, and it is possible to reliably select the electric power supply by the battery 107.

Second Modified Example

In the example shown in FIG. 9, the control is performed such that the ENG electric supply is performed in Step S114. Thereby, at the time of V2L connection, it is possible to perform an electric supply for a long period of time by the ENG electric supply. However, there can be a case in which fuel (for example, gasoline) is consumed during the electric supply, and it becomes impossible to continue the electric supply. Therefore, in the second embodiment, in a case where a remaining gasoline amount becomes a predetermined remaining amount, control is performed such that an electric power supply of electric power generation by the engine 101 is automatically switched to an electric power supply by the battery 107, and the electric supply is performed. The configuration of the electric vehicle 1 is the same as that of FIG. 1.

Figure 11:
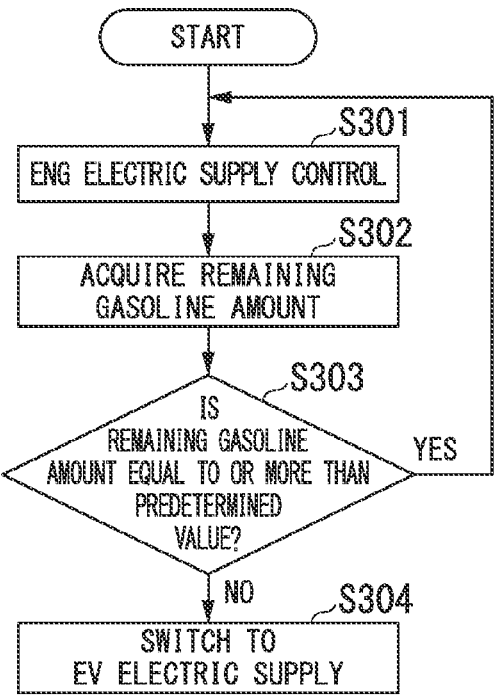
FIG. 11 is a flowchart of an example of a process procedure of information exchange before the start of charging/discharging according to a second modified example of the embodiment.

FIG. 11 is a flowchart of an example of a process procedure of information exchange before the start of charging/discharging according to the second modified example of the embodiment. The following process is performed in a process of performing an electric power amount supply from the electric vehicle 1 to the electric power supply target apparatus 2 in the process of FIG. 5. In this case, in a period of time in which electric power is supplied, the electric vehicle 1 performs the following process at a predetermined cycle. In the following process, it is determined that the category is category 0 by the preprocessing, and the ENG electric supply is performed.

(Step S301) The control part 114 performs control such that the ENG electric supply is performed.

(Step S302) The control part 114 acquires information indicating a remaining gasoline amount that is output by the remaining gasoline amount acquisition part 117.

(Step S303) The control part 114 determines whether or not the remaining gasoline amount is equal to or more than a predetermined value. A threshold value which is the predetermined value is stored by the storage part 116. In a case where it is determined that the remaining gasoline amount is equal to or more than the predetermined value (Step S303; YES), the control part 114 causes the process to return to Step S301, and in a case where it is determined that the remaining gasoline amount is less than the predetermined value (Step S303; NO), the control part 114 advances the process to Step S304.

(Step S304) The control part 114 switches the ENG electric supply to the EV electric supply.

As described above, in the second modified example, in the case of the ENG electric supply, the remaining gasoline amount is acquired, and the ENG electric supply is switched to the EV electric supply when the remaining gasoline amount is less than the predetermined value.

Thereby, according to the second modified example, in a case where the remaining gasoline amount becomes less than the predetermined value during the engine electric supply, and the electric power generation becomes difficult, it is possible to switch the engine electric supply to the electric power supply from the battery 107, and therefore, it is possible to continue the electric supply without interruption.

In FIG. 11, gasoline is described as an example of fuel; however, fuel is not limited thereto.

Third Modified Example

The second modified example is described using an example in which, in the ENG supply, the ENG supply is switched to the EV supply when the remaining gasoline amount becomes less than the predetermined value. The third modified example is described using an example in which, when an electric power generation defect occurs in the electric power generation part 10 at the time of the ENG supply, the ENG supply is switched to the EV supply. The configuration of the electric vehicle 1 is the same as that of FIG. 1.

Figure 12:
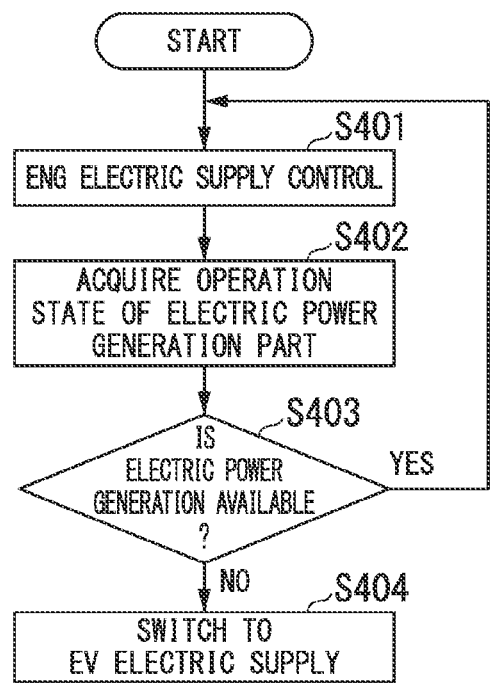
FIG. 12 is a flowchart of an example of a process procedure of information exchange before the start of charging/discharging according to a third modified example of the embodiment.

FIG. 12 is a flowchart of an example of a process procedure of information exchange before the start of charging/discharging according to the third modified example of the embodiment. The following process is performed in a process of performing an electric power amount supply from the electric vehicle 1 to the electric power supply target apparatus 2 in the process of FIG. 5. In this case, in a period of time in which electric power is supplied, the electric vehicle 1 performs the following processes at a predetermined cycle. In the following process, it is determined that the category is category 0 by the preprocessing, and the ENG electric supply is performed.

(Step S401) The control part 114 performs control such that the ENG electric supply is performed.

(Step S402) The control part 114 acquires information indicating an operation state of the electric power generation part that is output by the electric power generation part 10.

(Step S403) The control part 114 determines whether or not electric power generation by the electric power generation part 10 is available on the basis of the information indicating the operation state of the electric power generation part. In a case where it is determined that electric power generation by the electric power generation part 10 is available (Step S403; YES), the control part 114 causes the process to return to Step S401, and in a case where it is determined that electric power generation by the electric power generation part 10 is not available (Step S403; NO), the control part 114 advances the process to Step S404.

(Step S404) The control part 114 switches the ENG electric supply to the EV electric supply.

As described above, in the third modified example, in the case of the ENG electric supply, the information indicating the operation state of the electric power generation part is acquired, and the ENG electric supply is switched to the EV electric supply when the electric power generation by the electric power generation part is not available.

Thereby, according to the third modified example, in a case where electric power generation becomes difficult for some reason during the ENG electric supply, it is possible to switch the ENG electric supply to the electric power supply from the battery 107, and therefore, it is possible to continue the electric supply without interruption.

The above embodiment is described using an example in which the electric vehicle 1 is a PHEV; however, the electric vehicle may be an FCV. In this case, in the configuration of FIG. 1 to FIG. 4, the engine 101 is a FC (Fuel Cell) electric power generation part.

<Operation Example in External Electric Supply>

An operation example when performing an electric power amount supply from the electric vehicle 1 to the electric power supply target apparatus 2 is described.

Figure 13:
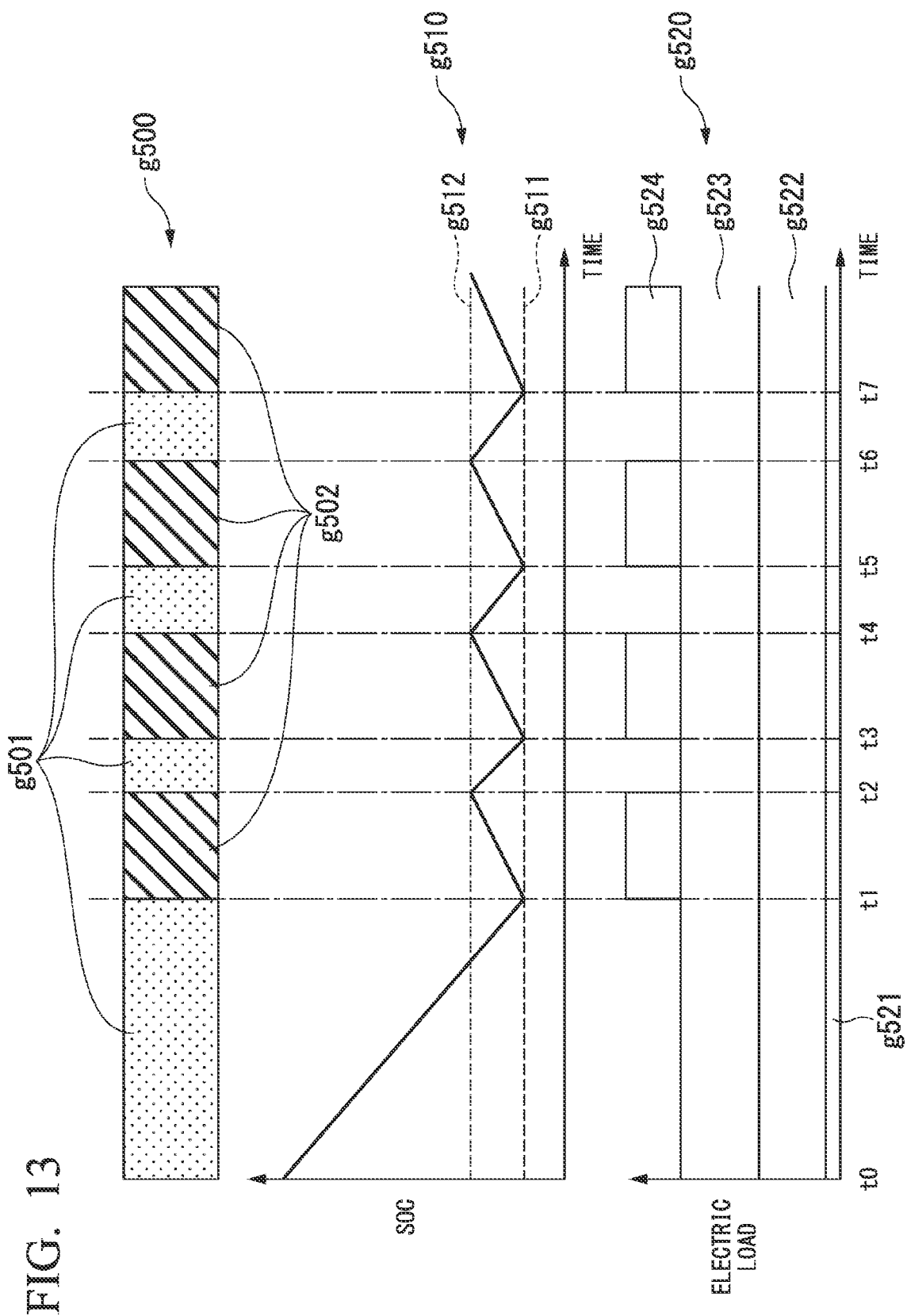
FIG. 13 is a view showing an operation example when performing an electric power amount supply from the electric vehicle to the electric power supply target apparatus.

FIG. 13 is a view showing an operation example when performing an electric power amount supply from the electric vehicle 1 to the electric power supply target apparatus 2.

In FIG. 13, a drawing of a reference symbol g500 shows discharging from the battery 107 or charging to the battery 107. A reference symbol g501 represents a state of discharging from the battery 107. A reference symbol g502 represents a state of charging to the battery 107.

A graph of a reference symbol g510 represents a remaining capacity of the battery 107 versus time. The horizontal axis is time, and the vertical axis is a SOC (remaining capacity). A reference symbol g511 represents a first threshold value, and a reference symbol g512 represents a second threshold value. The first threshold and the second threshold are stored by the storage part 116.

A drawing of a reference symbol g520 is a view showing a change of an electric load versus time. A reference symbol g521 represents a 12V system load, a reference symbol g522 represents an AC load, a reference symbol g523 represents an external load, and a reference symbol g524 represents a load by the charging to the battery 107. The AC load describes an air conditioner load having large electric power consumption as a consumption example inside the vehicle.

As shown in FIG. 13, the electric vehicle 1 performs discharging from the battery 107 in a period of time from a time t0 to a time t1 when supplying electric power to the outside. Then, when the remaining capacity of the battery 107 becomes equal to or less than the first threshold value, the control part 114 switches the discharging of the battery 107 to charging to the battery 107. Then, the control part 114 performs control such that charging to the battery 107 is performed until the time t2 at which the remaining capacity of the battery 107 reaches the second threshold value. The control part 114 switches the charging to discharging from the battery 107 at the time t2. The control part 114 performs the charging to the battery 107 by driving the engine 101. The control part 114 stops the engine 101 during the electric supply from the battery 107.

That is, the control part 114 first supplies electric power of the battery 107 to the outside. Then, when the remaining capacity of the battery 107 reaches the first threshold value (lower limit SOC), the control part 114 starts the engine 101, switches a range (CD (Charge-Depleting) range) of an electric power travel by external charging electric power to a range (CS (Charge-Sustaining) range) of hybrid travel by the engine driving, and starts charging to the battery 107. Then, when the remaining capacity of the battery 107 reaches the second threshold value (CD/CS switch SOC), the control part 114 stops the engine 101, terminates the charging to the battery 107, and switches to the electric supply from the battery 107.

In the embodiment, by performing control as described above, it is possible to perform an electric power amount supply from the electric vehicle 1 to the electric power supply target apparatus 2 for a long period of time.

A program for realizing all or some of the functions of the control part 114 according to the present invention may be recorded in a computer-readable recording medium, the program recorded in the recording medium may be read into and executed by a computer system, and thereby, all or some of the processes performed by the control part 114 may be performed. It is assumed that the term "computer system" used herein includes an OS or hardware such as peripherals. It is also assumed that the term "computer system" includes a WWW system which includes a homepage-providing environment (or a display environment).

The term "computer-readable recording medium" refers to a portable medium such as a flexible disk, a magneto-optical disk, a ROM, or a CD-ROM or a storage device such as a hard disk embedded in the computer system. It is also assumed that the term "computer-readable recording medium" includes a medium which holds a program for a given time such as a volatile memory (RAM) in the computer system which becomes a server or a client when a program is transmitted through a network such as the Internet or a communication line such as a telephone line.

The program may be transmitted from the computer system which stores the program in the storage device or the like, to another computer system through a transmission medium or through transmission waves in the transmission medium. The term "transmission medium" which transmits the program refers to a medium having a function of transmitting information that is, for example, a network (communication network) such as the Internet or a communication line such as a telephone line. The program may be a program for realizing some of the above-described functions. The program may be a so-called differential file (differential program) which can realize the above-described functions by a combination with a program already recorded in the computer system.

Although an embodiment of the present invention has been described, the present invention is not limited to such an embodiment, and various modifications and substitutions can be made without departing from the scope of the present invention.

DESCRIPTION OF THE REFERENCE SYMBOLS

1 Electric vehicle
2 Electric power supply target apparatus
10 Electric power generation part
20 Electric power storage part
101 Engine
102 Generator
103 Inverter
105 Boost converter
106 Contactor
108 Contactor
109 Connection part
110 Operation part
111 Inverter
112 Motor
113 GPS reception part
114 Control part
115 Display part
116 Storage part
117 Remaining gasoline amount acquisition part
118 PWSW

What is claim is:
1. An electric vehicle that is able to supply electric power to an outside of a vehicle, the electric vehicle comprising:
an electric power generation part;
an electric power storage part; and
a control part that performs control such that electric power supplied from the electric power generation part or electric power supplied from the electric power storage part is automatically selected on a vehicle side in response to information obtained from an electric power supply target apparatus at the outside of the vehicle, and an electric power supply to the electric power supply target apparatus is performed, wherein
the vehicle and the electric power supply target apparatus perform an information exchange before starting charging/discharging,
the exchanged information are information regarding the vehicle and information regarding the electric power supply target apparatus,
the control part starts a current input/output process with the electric power supply target apparatus based on the information; determines whether the information regarding the electric power supply target apparatus is present or absent based on the exchanged information before starting charging/discharging, determines a type of the information regarding the electric power supply target apparatus when the information regarding the electric power supply target apparatus is present, and determines whether the electric power supply target apparatus deals with discharging or does not deal with discharging; and determines, based on a determination result, whether a charging control is performed, an electric vehicle electric supply mode in which an operation of the electric power generation part is stopped and the electric power stored by the electric power storage part is supplied to the electric power supply target apparatus is performed, or an engine electric supply mode in which the electric power generation part is operated and the electric power generated by the electric power generation part and the electric power stored by the electric power storage part are supplied to the electric power supply target apparatus is performed, and performs a control.

2. The electric vehicle according to claim 1, wherein the electric power generation part is an engine, and the electric power storage part is a battery.

3. The electric vehicle according to claim 2, wherein the control part selects an electric power supply of electric power generation by an engine which is the electric power generation part in a case where the electric power supply target apparatus is a movable electric power converter.

4. The electric vehicle according to claim 2, wherein the control part switches to an electric power supply by a battery which is the electric power storage part and continues an electric supply in a case where electric power generation fails during an electric supply of electric power generation by an engine which is the electric power generation part.

5. The electric vehicle according to claim 2, wherein the control part automatically switches an electric power supply by electric power generation of an engine which is the electric power generation part to an electric power supply by a battery which is the electric power storage part and performs an electric supply in a case where a remaining gasoline amount becomes a predetermined remaining amount.

6. The electric vehicle according to claim 1, wherein the control part selects an electric power supply from the electric power storage part in a case where the electric power supply target apparatus is other than a movable electric power converter.

7. The electric vehicle according to claim 1, wherein the control part selects an electric power supply from the electric power storage part in a case where the electric power supply target apparatus is provided in a home.

8. The electric vehicle according to claim 1, wherein the control part selects an electric power supply from the electric power storage part in a case where an electric supply is performed at a place where idling is regulated based on information obtained from the electric power supply target apparatus or position information of the electric vehicle.

9. An electric vehicle control method in an electric vehicle that includes an electric power generation part and an electric power storage part and that is able to supply electric power to an outside of a vehicle, the electric vehicle control method including:
a step in which a control part performs control such that electric power supplied from the electric power generation part or electric power supplied from the electric power storage part is automatically selected on a vehicle side in response to information obtained from an electric power supply target apparatus at the outside of the vehicle, and an electric power supply to the electric power supply target apparatus is performed;
a step in which the vehicle and the electric power supply target apparatus perform an information exchange before starting charging/discharging, wherein the exchanged information are information regarding the vehicle and information regarding the electric power supply target apparatus;
a step in which the control part starts a current input/output process with the electric power supply target apparatus based on the information;
a step in which the control part determines whether the information regarding the electric power supply target apparatus is present or absent based on the exchanged information before starting charging/discharging, determines a type of the information regarding the electric power supply target apparatus when the information regarding the electric power supply target apparatus is present, and determines whether the electric power supply target apparatus deals with discharging or does not deal with discharging; and
a step in which the control part determines, based on a determination result, whether a charging control is performed, an electric vehicle electric supply mode in which an operation of the electric power generation part is stopped and the electric power stored by the electric power storage part is supplied to the electric power supply target apparatus is performed, or an engine electric supply mode in which the electric power generation part is operated and the electric power generated by the electric power generation part and the electric power stored by the electric power storage part are supplied to the electric power supply target apparatus is performed, and performs a control.

* * * * *